United States Patent

Nishiyama et al.

(10) Patent No.: US 9,004,605 B2
(45) Date of Patent: Apr. 14, 2015

(54) VEHICLE SEAT

(71) Applicant: Toyota Boshoku Kabushiki Kaisha, Aichi-ken (JP)

(72) Inventors: Kunio Nishiyama, Aichi-ken (JP); Yui Watanabe, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 48 days.

(21) Appl. No.: 13/900,990

(22) Filed: May 23, 2013

(65) Prior Publication Data

US 2013/0313885 A1 Nov. 28, 2013

(30) Foreign Application Priority Data

May 28, 2012 (JP) ................. 2012-120498

(51) Int. Cl.
*B60N 2/44* (2006.01)
*B60N 2/64* (2006.01)
*B60N 2/70* (2006.01)

(52) U.S. Cl.
CPC *B60N 2/44* (2013.01); *B60N 2/643* (2013.01); *B60N 2/646* (2013.01); *B60N 2/70* (2013.01)

(58) Field of Classification Search
USPC ............ 297/452.23, 452.26, 452.27, 452.35, 297/452.37, 452.6, 452.62
See application file for complete search history.

(56) References Cited

U.S. PATENT DOCUMENTS

| 3,000,020 | A | * | 9/1961 | Lombard et al. | 297/452.27 |
| 3,161,436 | A | * | 12/1964 | Hood | 297/452.27 |
| 3,713,696 | A | * | 1/1973 | Dudley | 297/452.55 |
| 3,848,926 | A | * | 11/1974 | Kuroishi | 297/452.53 |
| 4,403,356 | A | * | 9/1983 | Urai | 297/452.27 |
| 4,579,388 | A | * | 4/1986 | Urai | 297/452.61 |
| 4,747,638 | A | * | 5/1988 | Saito | 297/452.62 |
| 4,772,070 | A | * | 9/1988 | Leto et al. | 297/228.12 |
| 4,975,135 | A | * | 12/1990 | Lowe | 297/DIG. 1 |
| 6,247,751 | B1 | * | 6/2001 | Faust et al. | 297/180.13 |
| 2006/0273650 | A1 | * | 12/2006 | Embach | 297/452.27 |

FOREIGN PATENT DOCUMENTS

| JP | 07308233 | 11/1995 |
| JP | 2005-329090 | 12/2005 |
| JP | 2011-084207 | 4/2011 |

* cited by examiner

*Primary Examiner* — Peter Brown
(74) *Attorney, Agent, or Firm* — Greenblum & Bernstein, P.L.C.

(57) ABSTRACT

A vehicle seat is such that a seating surface is formed by a plurality of pad block portions, each of which has a convex shape due to a pleat structure, that are fit together, with a sectional shape in a width direction of the seating surface being a concave shape. Even at a location of the seating surface formed in the concave shape that is affected by a difference in body shape of a seated person, a shape of the location is formed in a shape following the body shape of the seated person.

2 Claims, 4 Drawing Sheets

VEHICLE SEAT

INCORPORATION BY REFERENCE

The disclosure of Japanese Patent Application No. 2012-120498 filed on May 28, 2012 including the specification, drawings and abstract is incorporated herein by reference in its entirety.

BACKGROUND OF THE INVENTION

1. Field of the Invention

The invention relates to vehicle seat. More particularly, the invention relates to a vehicle seat in which a seating surface of a seat cushion or a seatback is formed with a pleat structure.

2. Description of Related Art

When a cover of a seat cushion or a seatback that forms a vehicle seat is made of leather material, a seating surface is often attached by a pleat structure. When the seating surface is formed with a pleat structure, pad block portions that are divided by this pleat structure are formed as convex shapes. Therefore, the overall shape of the seating surface is formed by a plurality of convex pad block portions that are fit together. Also, regardless of whether the seating surface is a seat cushion or a seatback, the center portion position is a flat surface, with so-called side portions that are positioned on both sides in the width direction shaped protruding toward a seated person, such that the overall shape of the seating surface is a concave shape. As a result, seating performance such as so-called holding performance of the seated person to the seating surface is able to be ensured. With a seat cushion, the protruding shape of the side portions toward the seated person, which makes the overall seating surface a convex shape, is a shape that rises up from a top surface at a middle position as shown by the broken line in FIG. 6. Also, this rising position on both sides is a position that enables the top surface to be formed relatively wide, taking into account differences in body shapes, e.g., physical builds, of seated people. As a result, the vehicle seat is able to be applied to a seated person of average build. The protruding side portions are formed with hard pads to receive the body as it rolls when lateral acceleration is applied to the seated person.

However, with a seating surface in which the concave-shaped top surface of the seating surface is formed wide and the side portions on both sides are positioned relatively far apart from each other as described above, the shape of the buttocks (i.e., the rear) of the seated person does not match the position of joining portions where the side portions and the flat top portion join together, and as a result, a gap is created therebetween. Therefore, the buttocks of the seated person tend not to be well-received by the overall seating surface (i.e., the overall seating surface tends not to fit the buttocks of the seated person well), and as a result, the so-called seating comfort is poor. Also, with a structure of a seating surface such as that described above, a gap is created on both sides of a seated person having a narrow build, so the holding performance may deteriorate. Forming the side portions closer together on both sides would solve this problem for a person having a narrow build, but would conversely make it more difficult to seat a wider person, so the seating comfort (i.e., the fit) and the holding performance may both be poor. Thus, in this way, it has been difficult to obtain good seating performance such as holding performance and seating comfort for people of different body shapes, e.g., physical builds.

SUMMARY OF THE INVENTION

The invention thus provides a vehicle seat that obtains good seating performance, and more particularly, that obtains good seating performance even if there is a difference in body shape, e.g., physical build, of a seated person.

One aspect of the invention relates to a vehicle seat in which a seating surface is formed by a plurality of pad block portions, each of which has a convex shape due to a pleat structure, that are fit together, with a sectional shape in a width direction of the seating surface being a concave shape. With this structure, even at a location of the seating surface formed in the concave shape that is affected by a difference in body shape of a seated person, a shape of the location is formed in a shape following the body shape of the seated person.

According to this aspect, the basic shape of the seating surface for a seated person is a concave shape that follows the body shape of the average seated person, even at a location of the seating surface that is affected by a difference in body shape of a seated person, which in the past would become a gap, so a good seating state is able to be obtained. When the entire seating surface fits the body in this way, the contact area between the seating surface and the body increases, so peak pressure decreases, and thus numbness and discomfort when seated is able to be reduced. Also, swaying (lateral acceleration) of the body when the vehicle is running is inhibited. As a result, fatigue of the seated person is able to be reduced.

In the vehicle seat described above, the location that is affected by a difference in body shape of the seated person may be a position on both sides of a concave-shaped seating portion, and may be arranged such that the pad block portions arranged in the position on both sides have shapes that follow the body shape of the seated person. With this kind of structure, the shape follows the body shape of the seated person even at the position on both sides of the concave-shaped seating surface that were gaps, so a good seating state is able to be obtained.

Also, a slab pad member that is softer than a molded pad member that is arranged as a base, may be arranged on a pad block portion that is arranged in the location of the concave shape that is affected by the difference in body shape of the seated person. Because the soft slab pad member is arranged on the pad block portion that is arranged at a location that is affected by a difference in body shape of the seated person, even if the body shape of the seated person at the seating portion is different from the basic concave shape of the seating surface, the soft slab pad member that is arranged at this location will bend into a concave shape matching the body shape, so a good sitting state is able to be obtained.

Also, at least a portion of the slab pad member may be such that an outer side high resilience slab pad member is arranged overlapping with an inner side low resilience slab pad member. This structure makes it possible for the slab pad member to bend according to the shape of the buttocks of the seated person, thereby enabling the seated person to be seated in an even better seating state.

According to the aspect of the invention described above, good seating performance is able to be obtained. In particular, even if there is a difference in body shape, e.g., physical build, of a seated person, good seating performance is able to be obtained. Also, when the soft slab pad member is arranged in a location on both sides of the concave shape that forms the seating surface, a good seating state is able to be effectively obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
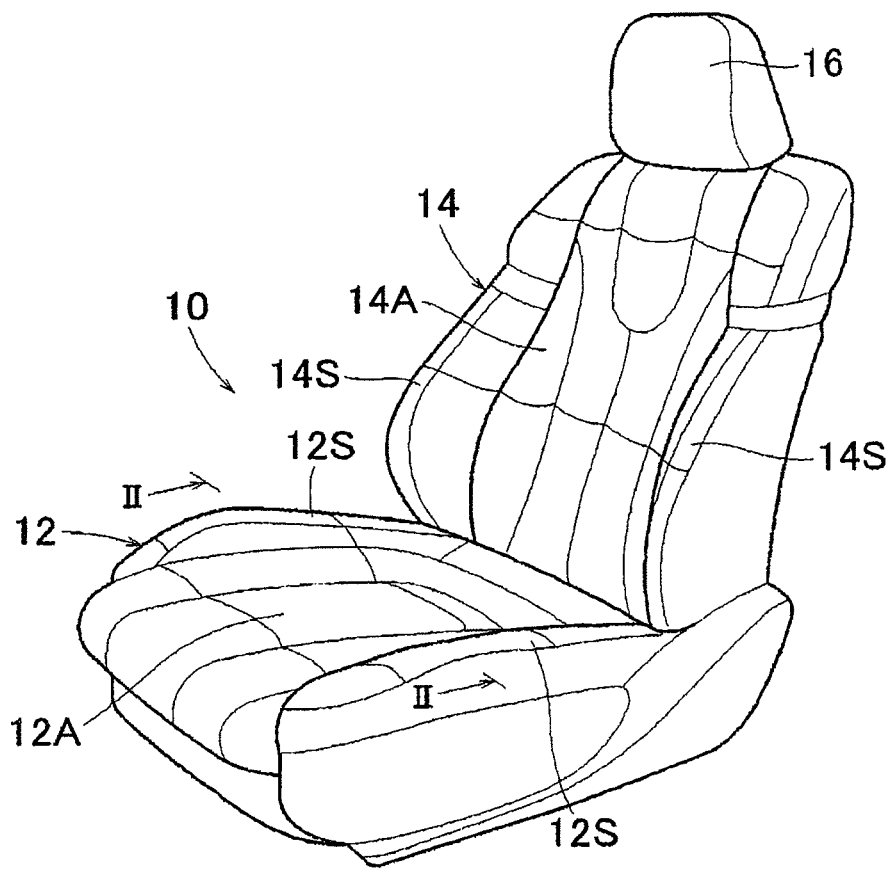
FIG. 1 is a perspective view of the appearance configuration of a vehicle seat according to one example embodiment of the invention.

Hereinafter, example embodiments of the invention will be described with reference to the accompanying drawings. FIG. 1 is a view of a vehicle seat 10 according to one example embodiment. The vehicle seat 10 includes a seat cushion 12 that serves as a seating portion for a seated person, a seatback 14 that serves as a backrest for the seated person, and a headrest 16 that is arranged on an upper portion of the seatback 14. An upper surface of the seat cushion 12 and a front surface of the seatback 14 are seating surfaces 12A and 14A, respectively, for the seated person. Leather material is used as a cover that forms these seating surfaces 12A and 14A. Also, the cover that is made of leather material is attached to each seat pad by a pleat structure, and is pulled taut.

Figure 2:
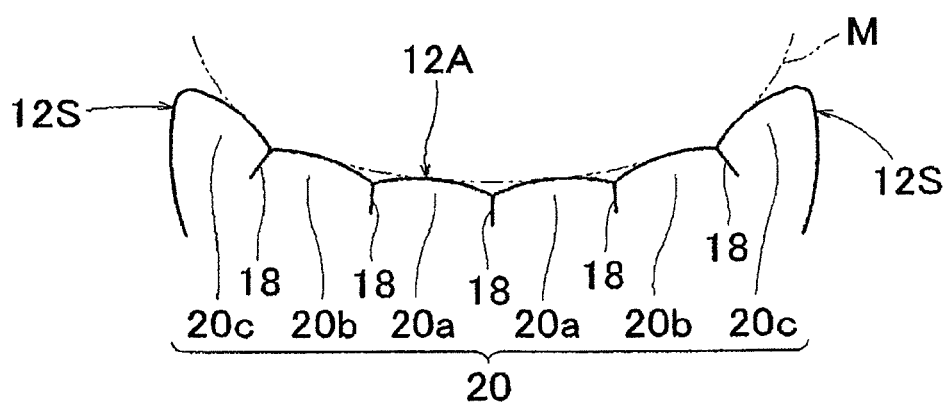
FIG. 2 is a sectional view taken along line II-II in FIG. 1.

The seat cushion 12 and the seatback 14 are both structures in which side portions 12S and 14S on both sides in a width direction are formed gently protruding toward the seated person. FIG. 2 is a sectional view taken along line II-II of the seat cushion 12 in FIG. 1. As is evident from FIG. 2, the sectional shape of the entire seating surface 12A is a smooth concave shape that follows the shape of the buttocks (i.e., the rear) M of the seated person. Also, the seating surface 12A is formed with pleat structures 18. Each pad block portion 20 formed between, and by, the pleat structures 18 is formed in a convex shape. The overall concave-shaped seating surface 12A is formed by a plurality of these pad block portions 20 that are fit together. In FIG. 2, the seating surface 12A is formed by six pad block portions 20a, 20b, and 20c that are fit together. Arranging a large number of the pad block portions 20 together in this way enables the size of each individual pad block portion 20 to be smaller, so the concave shape of the seating surface 12A can be shaped to more closely follow the shape of the buttocks M of the seated person. That is, with the structure shown in FIG. 2, the top portion in the center position is formed by four pad block portions 20a and 20b, so the concave shape of the top portion is more easily made to follow the shape of the buttocks of the seated person. Also, when the cover is made of leather material, if each individual pad block portion 20 is large, wrinkles tend to form in the surface because leather tends to stretch with moisture, which is problematic. However, if each individual pad block portion 20 is small, wrinkles will not easily form, which is advantageous.

Figure 3:
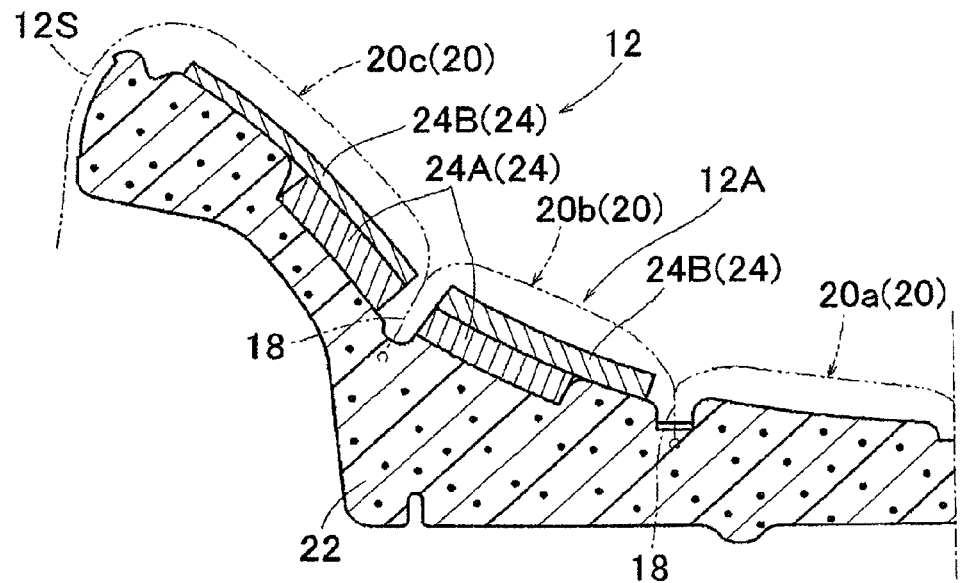
FIG. 3 is an enlarged sectional view of a first configuration example of half of a seat cushion in FIG. 2.

FIG. 3 is enlarged sectional view of a first configuration example of the left half of the seating surface 12A of the seat cushion 12 in FIG. 2. The seating surface 12A shown in FIG. 3 is formed by three pad block portions 20a, 20b, and 20c, and in between each of these is the pleat structure 18. A base pad member that forms the seat cushion 12 is a general-purpose molded pad member 22 and forms the basic shape of the seat cushion 12. Therefore, a relatively hard pad is used to firmly support the seated person. In this first configuration example, the locations that are affected by a difference in body shape of the seated person of this invention are the pad block portion 20b that forms part of the top portion, and the pad block portion 20c that forms the side portion 12S. A slab pad member 24 that is softer than the molded pad member 22 of the base pad member is arranged on a front surface portion at these locations.

In this first configuration example, in particular, the locations adjacent to the pad block portions 20b and the 20c are affected by a difference in body shape, so at these portions, a low resilience slab pad member 24A is arranged overlapping with a high resilience slab pad member 24B. The high resilience slab pad member 24B is arranged at outer side of these portions. The low resilience slab pad member 24A is arranged in inner side of the high resilience slab pad member 24B. The low resilience slab pad member 24A is arranged only on a portion of the front surface portion of each of the pad block portions 20b and 20c, but the high resilience slab pad member 24B is arranged across the entire surface of the front surface portion of each of these pad block portions 20b and 20c. The shape indicated by the virtual line on the surface in FIG. 2 indicates the outer shape of the cover. This cover is supported and attached by being drawn inside by the pleat structures. As a result, the outer surface of each of the pad block portions 20 is formed as a convex shape. This illustration is also the same for both FIGS. 4 and 5 that will be described later.

According to this first configuration example, the basic shape of the concave shape of the seating surface 12A is a shape that follows the shape of the buttocks of the seated person, so a seated person of average physical build is able to sit comfortably. As a result, the desired holding performance and seating comfort, i.e., fit, are able to be obtained. Also, even with a seated person that has a wide physical build that makes it difficult for the person is to fit well in the seat due to his or her width interfering with the side portion 12S, the person is able to be seated with a good fit on the seating surface 12A because the soft slab pad members are arranged on the pad block portions 20b and 20c at the locations where there is interference, and these soft slab pad members are able to bend according to the shape of the buttocks of the seated person. In this case, the pad block portion 20a that forms the top portion in the center position is formed by the hard molded pad member 22, so the basic seating is firm in this location, thus preventing the seated person from sinking in.

Figure 4:
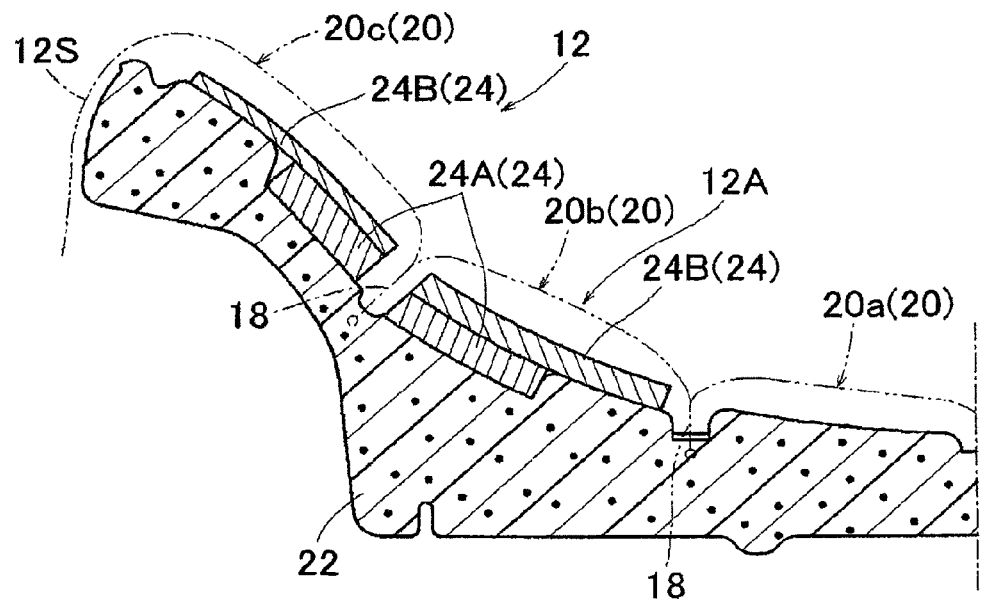
FIG. 4 is an enlarged sectional view of a second configuration example of half of the seat cushion in FIG. 2.
Figure 5:
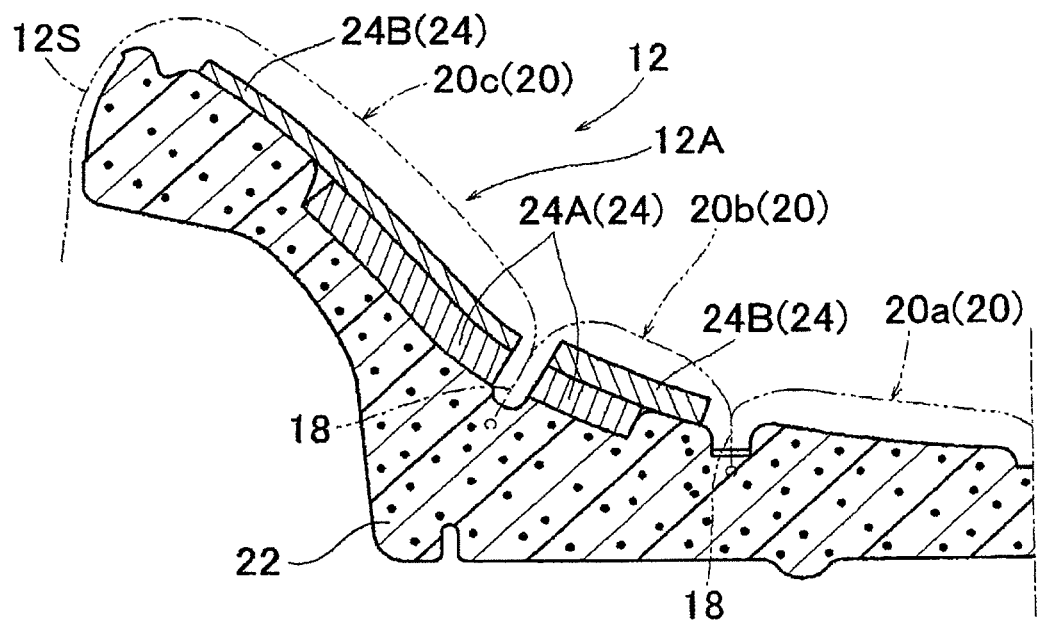
FIG. 5 is an enlarged sectional view of a third configuration example of half of the seat cushion in FIG. 2.
Figure 6:
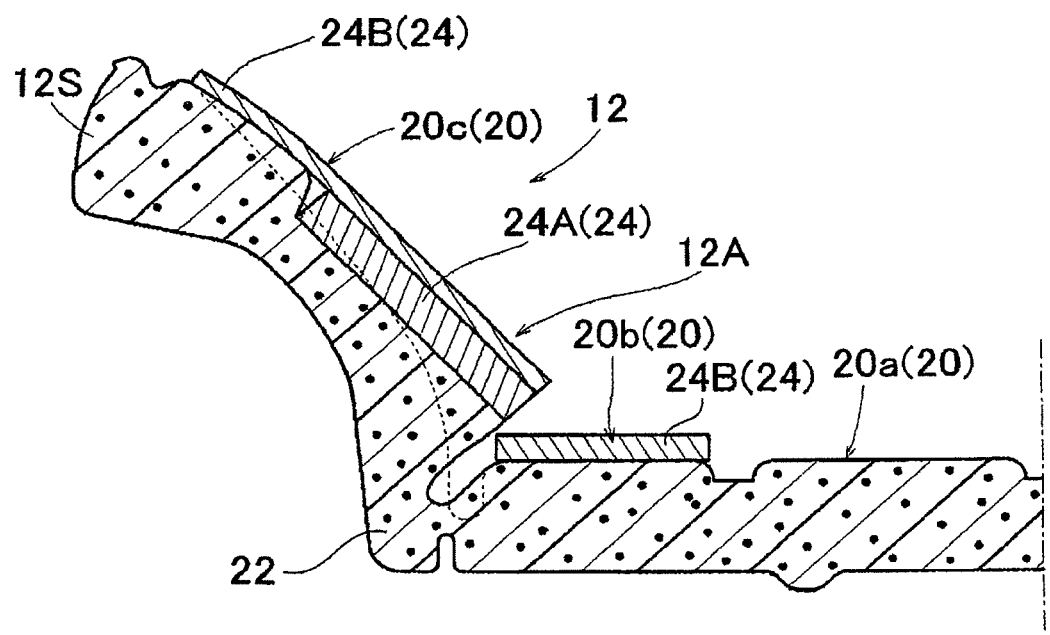
FIG. 6 is an enlarged sectional view of another configuration example of half of the seat cushion in FIG. 2.

FIG. 4 is a view of a second configuration example, and FIG. 5 is a view of a third configuration example. The basic structures of the second configuration example and the third configuration example are the same as that of the first configuration example shown in FIG. 3 described above. The difference is in the positions in which the pleat structures 18 are arranged. Therefore, the size of each of the pad block portions 20 in each configuration example is different. As a result, the concave shape that forms the seating surface 12A is able to be changed slightly, which is an effective measure for cases such as when forming the concave shape taking into account differences in the physical build of the average seated person in the destination country of the vehicle or the like. FIG. 6 is a view of another configuration example. In this configuration example, the low resilience slab pad member 24A is only arranged on the pad block portion 20c that forms the side portion 12S, and only the high resilience slab pad member 24B, not the low resilience slab pad member 24A, is arranged on the pad block portion 20b that forms the top portion.

Figure 7:
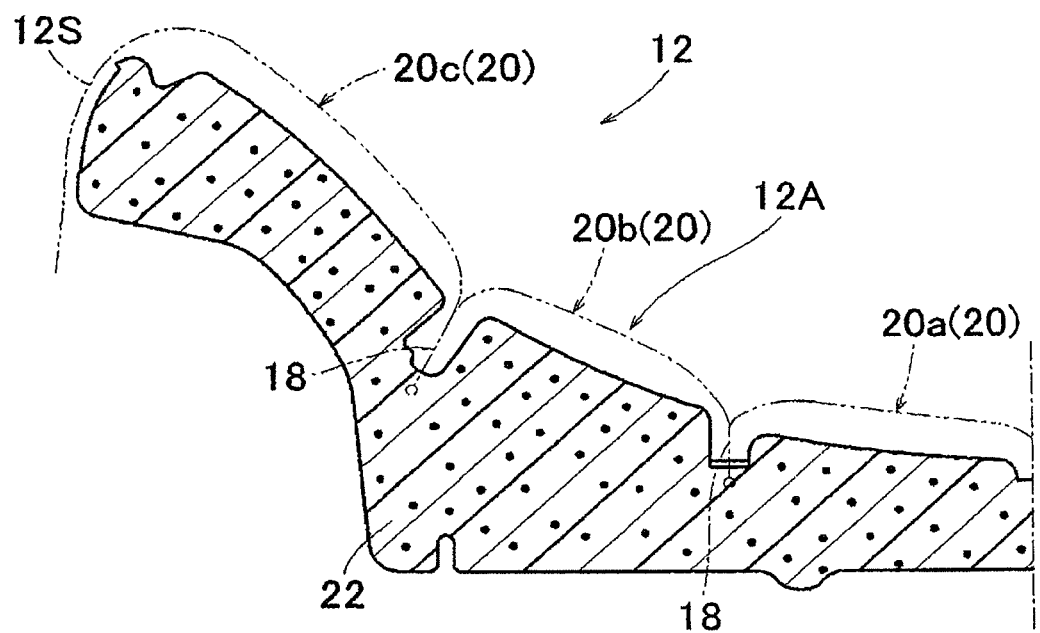
FIG. 7 is an enlarged sectional view of a modified example of half of the seat cushion in FIG. 2.

While example embodiments of the invention have heretofore been described, the invention may also be carried out with various other example embodiments. For example, in the description of the example embodiment above, the invention is applied to the seating surface 12A of the seat cushion 12, but the invention may also be applied to the seating surface 14A of the seatback 14. Further, in the example embodiment described above, the slab pad member 24 that is softer than the molded pad member 22 that is arranged as the base is arranged on the pad block portion that is arranged in a location that is affected by a difference in body shape of the seated person. Alternatively, however, the slab pad member 24 may be omitted, and only the molded pad member 22 may be arranged in a shape following the body shape of the seated person, as shown in FIG. 7. Also, in the example embodiment described above, the cover is made of leather material, but the cover may also be made of any of a variety of other materials such as fabric or synthetic leather. Also, the number of pad block portions 20 that form the seating surface is not limited to the number in this example embodiment, but may be set as appropriate. However, a larger number enables a more suitable concave shape to be formed, as described above. Also, making the size of each individual pad block portion smaller makes it possible to inhibit wrinkles from forming in a cover with the pleat structure.

What is claimed is:

1. A vehicle seat comprising:
a plurality of pad block portions defining a generally concave seating surface configured to accommodate a seated person, wherein
each of the plurality of pad block portions has a convex shape,
the plurality of pad block portions are fitted together so that the seating surface is defined as a pleated structure,
an interference fit portion is provided on both end sides of the seating surface to accommodate different body shapes of the seated person,
the interference fit portion includes a side pad block portion of the plurality of pad block portions and a top pad block portion of the plurality of pad block portions,
a slab pad member is provided on each of the side pad block portion and the top pad block portion and the slab pad member is softer than a base pad member on which the plurality of pad block portions are provided, and
the slab pad member includes an outer side high resilience slab pad member and an inner side low resilience slab pad member arranged such that the outer side high resilience slab pad member overlaps the inner side low resilience slab pad member in a seating surface direction.

2. The vehicle seat according to claim 1, wherein the inner side low resilience slab pad member extends partially across a seating side surface portion of the side pad block portion and a seating side surface portion of the top pad block portion, and the outer side high resilience slab pad member extends entirely across the seating side surface portion of the side pad block portion and the seating side surface portion of the top pad block portion.

* * * * *